(12) United States Patent
Nakamura et al.

(10) Patent No.: US 11,472,473 B2
(45) Date of Patent: Oct. 18, 2022

(54) MOTOR CONTROL DEVICE, MOTOR DRIVE SYSTEM AND MOTOR CONTROL METHOD

(71) Applicant: DENSO CORPORATION, Kariya (JP)

(72) Inventors: Koichi Nakamura, Kariya (JP); Nobuyori Nakajima, Kariya (JP); Masaya Taki, Kariya (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 16/857,503

(22) Filed: Apr. 24, 2020

(65) Prior Publication Data

US 2020/0247465 A1 Aug. 6, 2020

Related U.S. Application Data

(63) Continuation of application No. PCT/JP2018/042491, filed on Nov. 16, 2018.

(30) Foreign Application Priority Data

Nov. 30, 2017 (JP) .............................. JP2017-230332

(51) Int. Cl.
| | |
|---|---|
| *H02H 7/08* | (2006.01) |
| *B62D 5/04* | (2006.01) |
| *H02P 25/22* | (2006.01) |
| *H02P 27/06* | (2006.01) |

(52) U.S. Cl.
CPC ......... *B62D 5/0484* (2013.01); *B62D 5/0463* (2013.01); *H02P 25/22* (2013.01); *H02P 27/06* (2013.01)

(58) Field of Classification Search
CPC ..... B62D 5/0484; B62D 5/0463; H02P 25/22; H02P 27/06
USPC ...................................................... 318/400.21
See application file for complete search history.

(56) References Cited

U.S. PATENT DOCUMENTS

| | | | |
|---|---|---|---|
| 2015/0084570 A1 | 3/2015 | Hara | |
| 2017/0237377 A1* | 8/2017 | Furukawa | H02P 29/028 |
| | | | 318/564 |
| 2019/0081585 A1 | 3/2019 | Nakamura et al. | |
| 2020/0055542 A1* | 2/2020 | Yamamoto | H02P 27/08 |
| 2020/0076348 A1* | 3/2020 | Niwa | B62D 5/0484 |

FOREIGN PATENT DOCUMENTS

JP 2015-081013 A 4/2015

* cited by examiner

*Primary Examiner* — Erick D Glass
(74) *Attorney, Agent, or Firm* — Maschoff Brennan

(57) ABSTRACT

A motor control device is provided with a plurality of power converters and a plurality of microcomputers, and controls driving of a motor that has a plurality of sets of windings. The microcomputers perform initial check of components in respective circuits after activation. The microcomputers prohibit driving of the motor by a circuit determined to be abnormal during the initial inspection. When two or more circuits are determined to be normal in the initial check, the microcomputers start driving of the motor by synchronizing the timing between the two or more circuits determined to be normal. When only one circuit is determined to be normal in the initial check, the microcomputers start driving of the motor by the one circuit determined to be normal.

14 Claims, 15 Drawing Sheets

MOTOR CONTROL DEVICE, MOTOR DRIVE SYSTEM AND MOTOR CONTROL METHOD

CROSS REFERENCE TO RELATED APPLICATION

The present application is a continuation application of PCT application No. PCT/JP2018/042491 filed on Nov. 16, 2018, which claims the priority of Japanese Patent Application No. 2017-230332 filed on Nov. 30, 2017. The whole disclosures of both applications are incorporated herein by reference.

FIELD

The present disclosure relates to a motor control device that controls driving of a motor by a plurality of microcomputers, a motor drive system including the same, and a motor control method.

BACKGROUND

Conventional motor control devices control driving of a motor by a plurality of microcomputers provided redundantly. For example, an electric power steering device transmits and receives information between a main microcomputer and a sub-microcomputer, and determines an abnormality of a microcomputer by comparing a sensor detection value input to each microcomputer and a command value calculated by each microcomputer. A microcomputer determined to be abnormal stops its operation, and a microcomputer determined to be normal continues to drive a motor.

SUMMARY

A motor control device of the present disclosure controls driving of a motor having a plurality of winding sets. The motor control device includes a plurality of power converters and a plurality of microcomputers. The power converters are provided corresponding to the winding sets, respectively, convert power input from one or more power supplies, and supply the converted power to the winding sets, respectively. The microcomputers are provided corresponding to the power converters, respectively, and calculate drive signals which are instructed to the power converters. Units of components including the winding sets, the power converters and the microcomputers form systems, respectively. After activation, the microcomputers perform initial checks on the components of the systems, respectively.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENT

Figure 1:
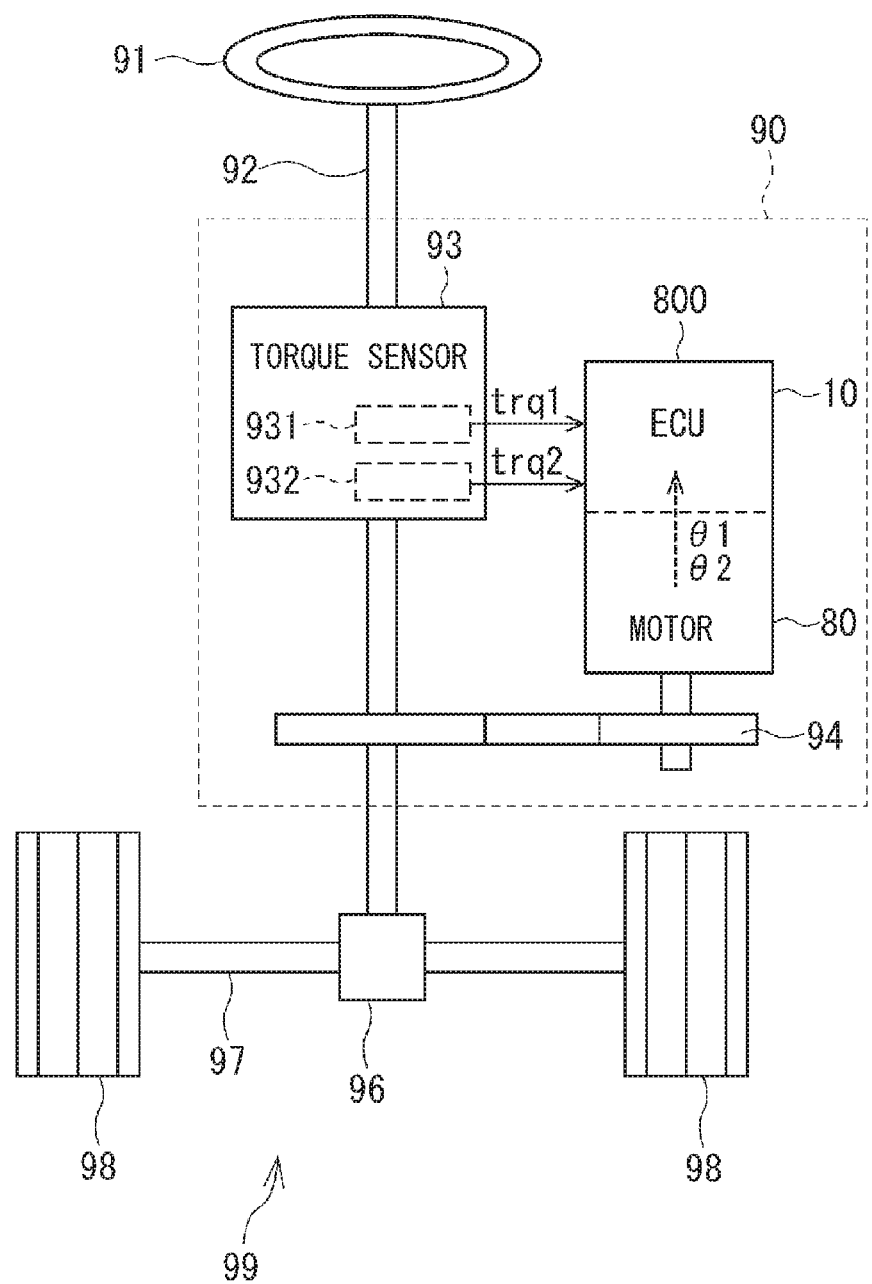
FIG. 1 is a schematic illustration of an electric power steering apparatus including an ECU which is applied as a motor driving system of a machine-electronics integrated type.

A motor control device will be described with reference to plural embodiments shown in the accompanying drawings. In each embodiment, an electronic control unit (ECU), which is provided as a motor control device and applied to an electric power steering apparatus of a vehicle, is configured to control power supply to a motor for outputting a steering assist torque of a vehicle. The ECU and the motor form a motor driving system. In the following embodiments, substantially same structural components are designated with the same reference numerals thereby to simplify the description. The following first to fourth embodiments are collectively referred to as a present embodiment unless otherwise specified.

Figure 2:
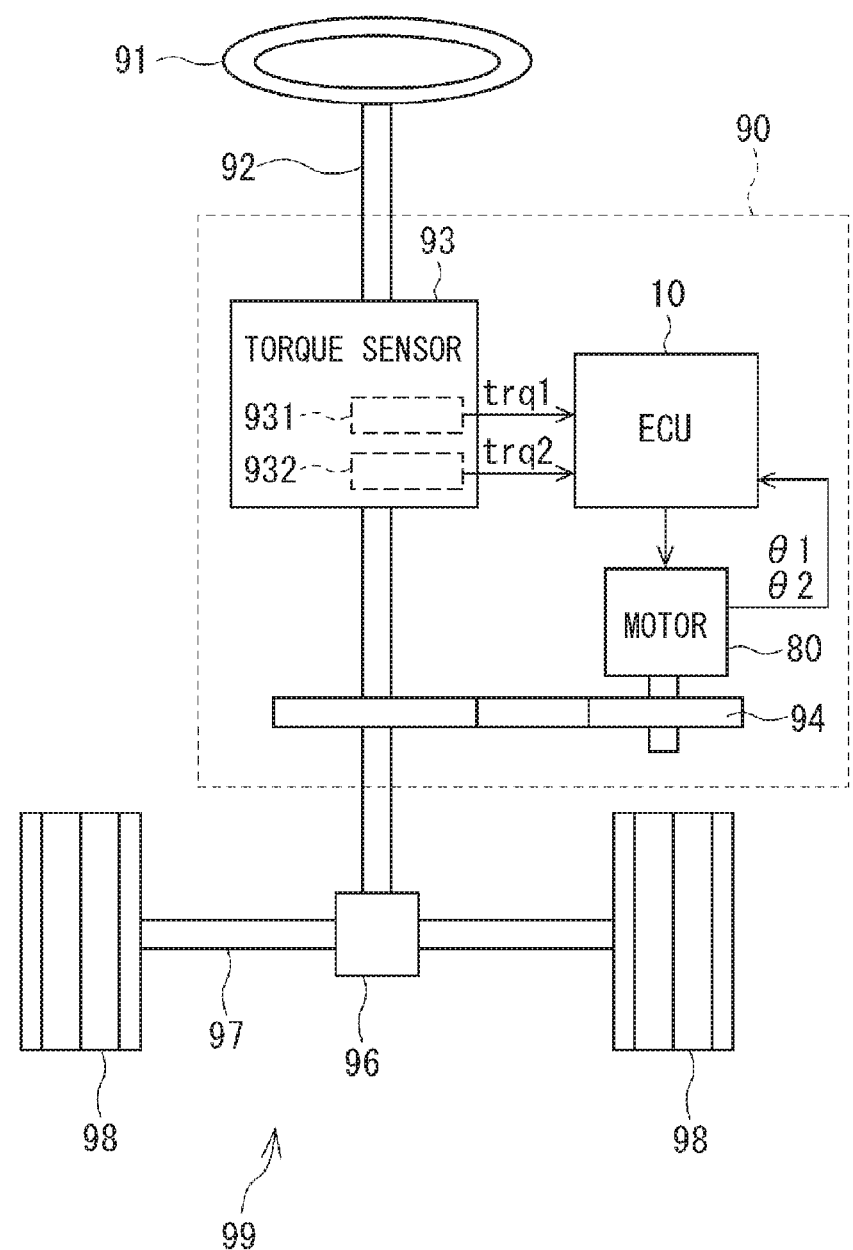
FIG. 2 is a schematic illustration of an electric power steering apparatus including an ECU which is applied as a motor driving system of a machine-electronics separated type.

First, a common configuration of an electric power steering apparatus, a motor driving system and the like in each embodiment will be described with reference to FIG. 1 to FIG. 4. FIG. 1 and FIG. 2 show an overall configuration of a steering system 99 including an electric power steering apparatus 90. FIG. 1 shows a configuration of a machine-electronics integrated type in which an ECU 10 is integrally mounted on one side in the axial direction of a motor 80. FIG. 2 shows a configuration of a machine-electronics separated type in which the ECU 10 and the motor 80 are connected via a harness. Although the electric power steering apparatuses 90 shown in FIG. 1 and FIG. 2 are a column assist type, it may be configured to be a rack assist type.

The steering system 99 includes a steering wheel 91, a steering shaft 92, a pinion gear 96, a rack shaft 97, road wheels 98, the electric power steering apparatus 90 and the like. The steering shaft 92 is coupled to the steering wheel 91. The pinion gear 96 provided at an axil end of the steering shaft 92 engages with the rack shaft 97. The pair of road wheels 98 is provided at both ends of the rack shaft 97 via, for example, tie rods. When a driver rotates the steering wheel 91, the steering shaft 92 coupled to the steering wheel 91 rotates. A rotational movement of the steering shaft 92 is converted into a linear movement of the rack shaft 97 by the pinion gear 96, and the pair of road wheels 98 is steered to an angle corresponding to a displacement amount of the rack shaft 97.

The electric power steering apparatus 90 includes a steering torque sensor 93, an ECU 10, a motor 80, a reduction gear 94 and the like. The steering torque sensor 93 is provided at an intermediate portion of the steering shaft 92 to detect a steering torque applied by the driver. In the embodiment shown in FIG. 1 and FIG. 2, the steering torque sensor 93 is a dual type, which includes a first torque sensor element 931 and a second torque sensor element 932, and detects a first steering torque trq1 and a second steering torque trq2, respectively, in a dual manner. In case that the steering torque sensor elements are not provided in redundancy, a detected value of one steering torque trq may be used in common for two systems, that is, first and second systems which will be described in detail later.

Based on the steering torques trq1 and trq 2, the ECU 10 controls driving of the motor 80 so that the motor 80 generates a desired assist torque. The assist torque generated by the motor 8 is transmitted to the steering shaft 92 via the reduction gear 94. The ECU 10 acquires electrical angles θ1, θ1 of the motor 80 detected by rotation angle sensors and the steering torques trq1, trq2 detected by the steering torque sensor 93. The ECU 10 controls driving of the motor 80 based on such detected information and other information such as a motor current detected inside the ECU 10.

Figure 3:
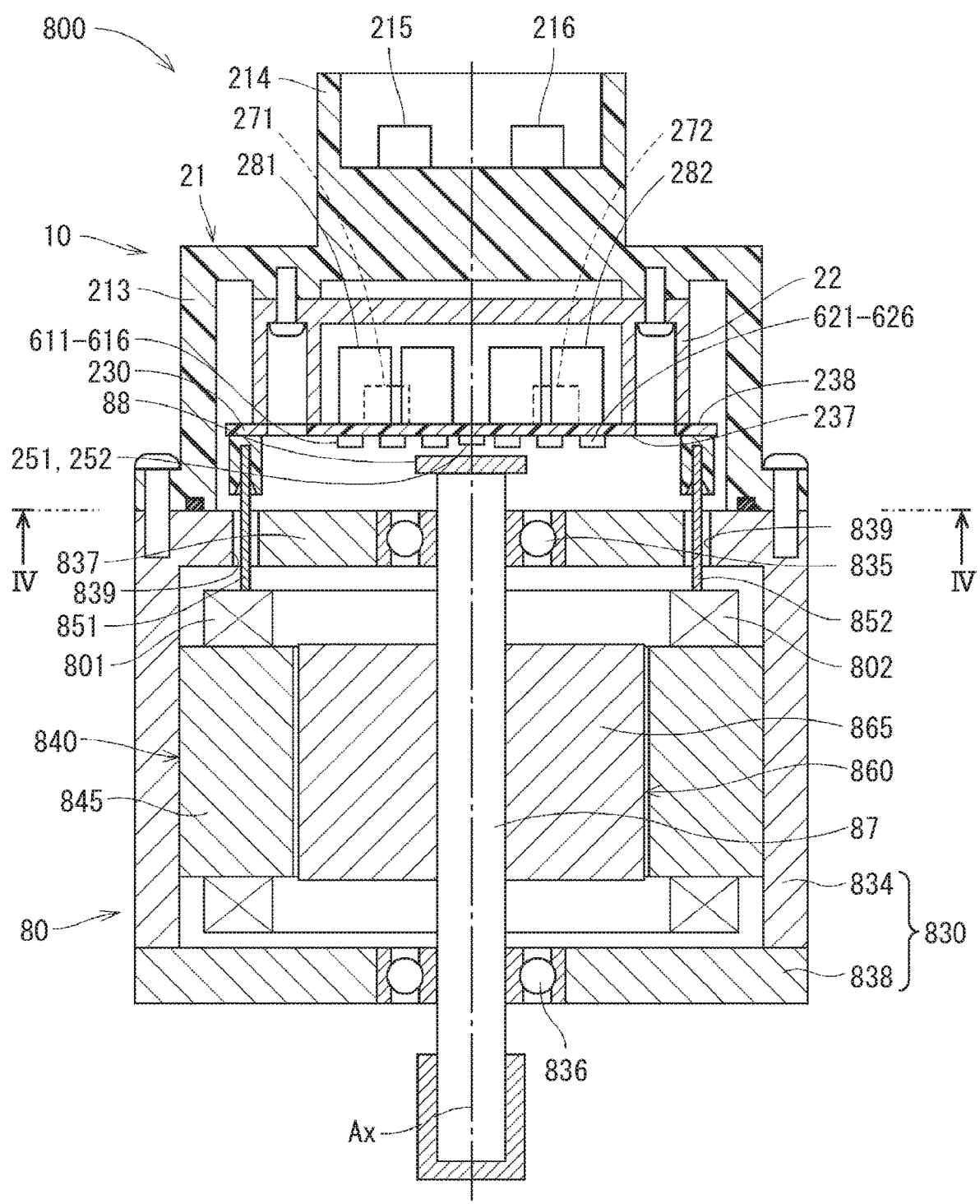
FIG. 3 is an axial cross-sectional view of a two-system machine-electronics integrated motor.
Figure 4:
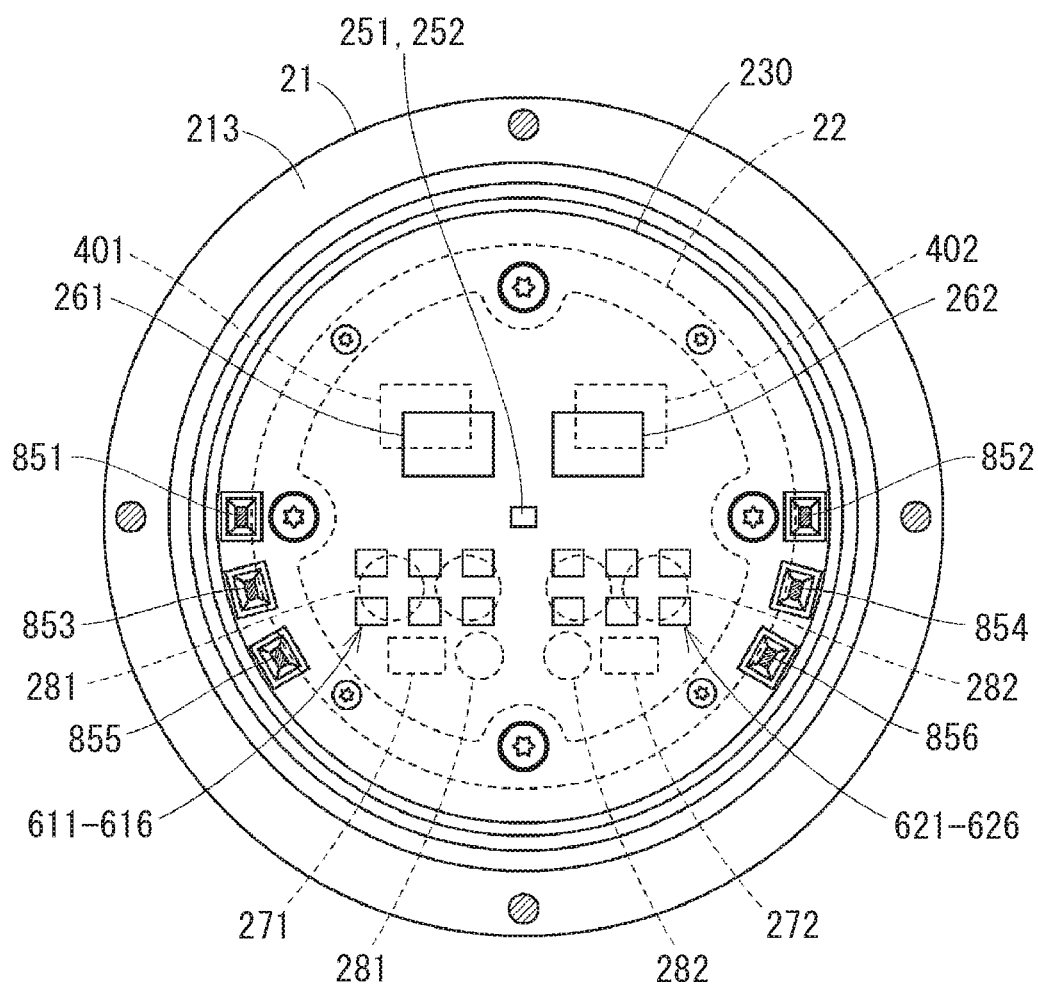
FIG. 4 is a cross-sectional view taken along line IV-IV of FIG. 3.

A machine-electronics integrated type configuration of the motor 80 and the ECU 10, in which the ECU 10 is integrally formed on one side in the axial direction of the motor 80, is indicated by a reference numeral 800 and will be described with reference to FIG. 3 and FIG. 4 in detail. As shown in FIG. 3, the ECU 10 is positioned coaxially with an axis Ax of the shaft 87 on the side opposite to an output side of the motor 80. As another embodiment, the ECU 10 may be configured integrally with the motor 80 on the output side of the motor 80. The motor 80 is a three-phase brushless motor which includes a stator 840, a rotor 840 and a housing 830 which houses them.

The stator 840 has a stator core 845 fixed to the housing 830 and first and second three-phase winding sets 801, 802 assembled to the stator core 845. Lead wires 851, 853 and 855 extend from each phase winding forming the first winding set 801. Lead wires 852, 854 and 856 extend from each phase winding forming the second winding set 802. The rotor 860 has a shaft 87, which is supported by a rear bearing 835 and a front bearing 836, and a rotor core 865, into which the shaft 87 is firmly fitted. The rotor 860 is provided radially inside the stator 840 to be rotatable relative to the stator 840. A permanent magnet 88 is provided at one end of the shaft 87.

The housing 830 has a bottomed cylindrical case 834, which has a rear end frame 837, and a front end frame 838, which is provided on an open end side of the bottomed cylindrical case 834. The bottomed cylindrical case 834 and the front end frame 838 are fastened to each other by bolts or the like. The lead wires 851, 852 and the like of each winding set 801, 802 are passed through lead wire insertion holes 839 of the rear end frame 837 to extend to the ECU 10 side and are connected to a circuit board 230.

The ECU 10 includes a cover 21, a heat sink 22 fixed to the cover 21, the circuit board 230 fixed to the heat sink 22 and other electronic components mounted on the circuit board 230. The cover 21 is provided to protect electronic components from external impacts and to prevent dust and water from entering into the ECU 10. The cover 21 is formed of a cover portion 213 and an external connection connector portion 214 for connection with external power supply cables and signal cables. Power supply terminals 215 and 216 of the external connection connector portion 214 are connected to the substrate 230 via a path not shown.

The circuit board 230 is, for example, a printed circuit board and is positioned to face the rear end frame 837 and fixed to the heat sink 22. On the circuit board 230, the electronic components of first and second systems are mounted independently for each system so that the two systems are provided in a fully redundant configuration. In the present embodiment, the circuit board 230 is provided singly but, as another embodiment, two or more circuit boards may be provided. Of two main surfaces of the circuit board 230, a surface facing the rear end frame 837 is referred to as a motor surface 237 and a surface opposite to the motor surface 237, that is, a surface facing the heat sink 22 is referred to as a cover surface 238.

On the motor surface 237, a plurality of switching elements 611 to 616, 621 to 626, rotation angle sensors 251, 252, custom ICs 261, 262 and the like are mounted. In the present embodiment, there are six switching elements 611 to 616, 621 to 626 for each system and form upper and lower arms of three phases of a motor driving circuit. The rotation angle sensors 251 and 252 are positioned to face the permanent magnet 88 provided at the axial end of the shaft 87. The custom ICs 261, 262 and microcomputers 401, 402 are provided as control circuits of the ECU 10.

On the cover surface 238, the microcomputers 401, 402, capacitors 281, 282, inductors 271, 272 and the like are mounted. In particular, the first microcomputer 401 and the second microcomputer 402 are positioned on the same cover surface 238 of the same circuit board 230 with a predetermined distance therebetween. The capacitors 281 and 282 smoothen input powers supplied from power supply batteries and prevent noise generated and flowing out due to the switching operation or the like of the switching elements 611 to 616 and 621 to 626, respectively. The inductors 271 and 272 form filter circuits together with the capacitors 281 and 282, respectively.

Figure 5:
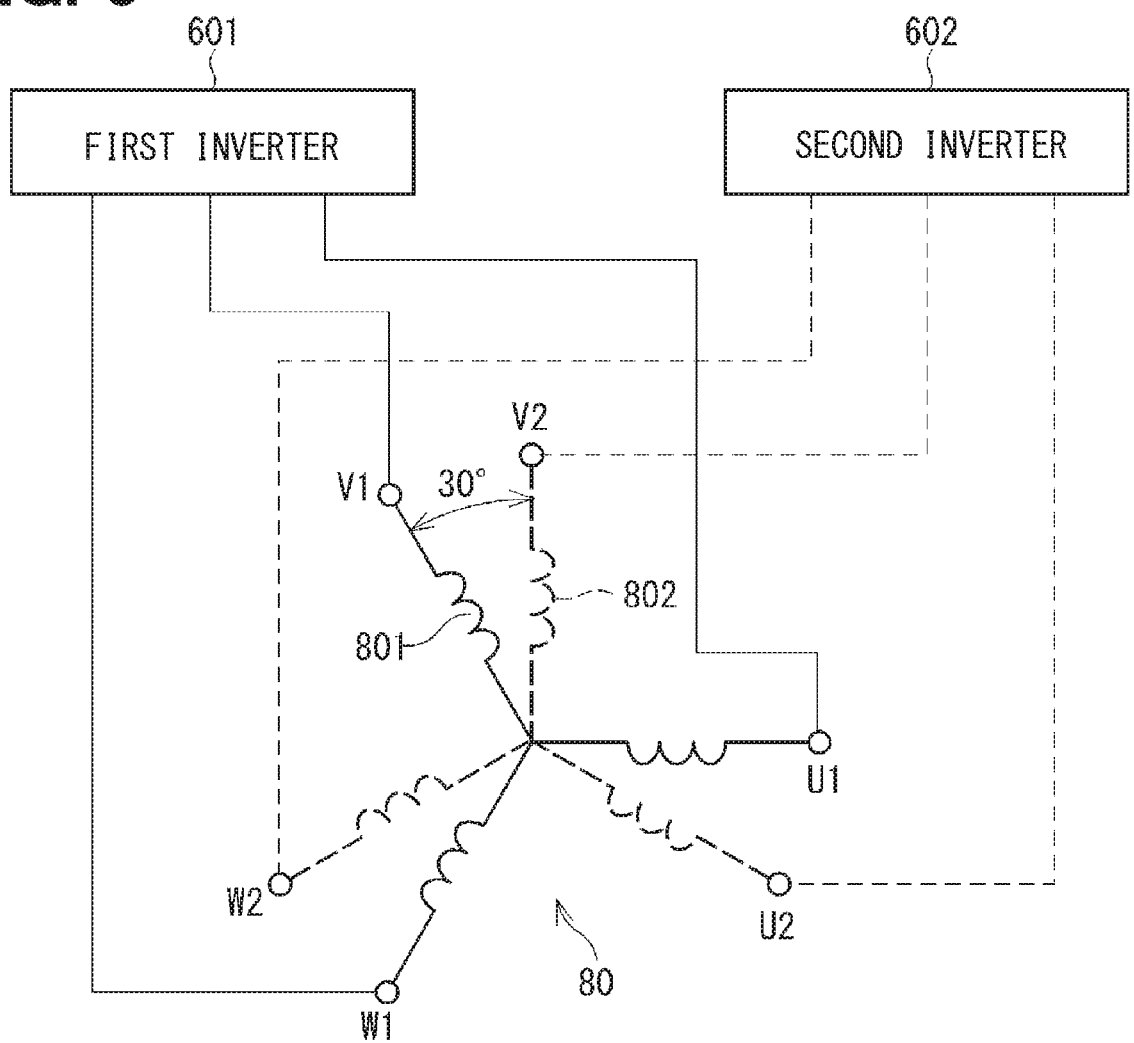
FIG. 5 is a schematic illustration showing a configuration of a multi-phase coaxial motor.
Figure 6:
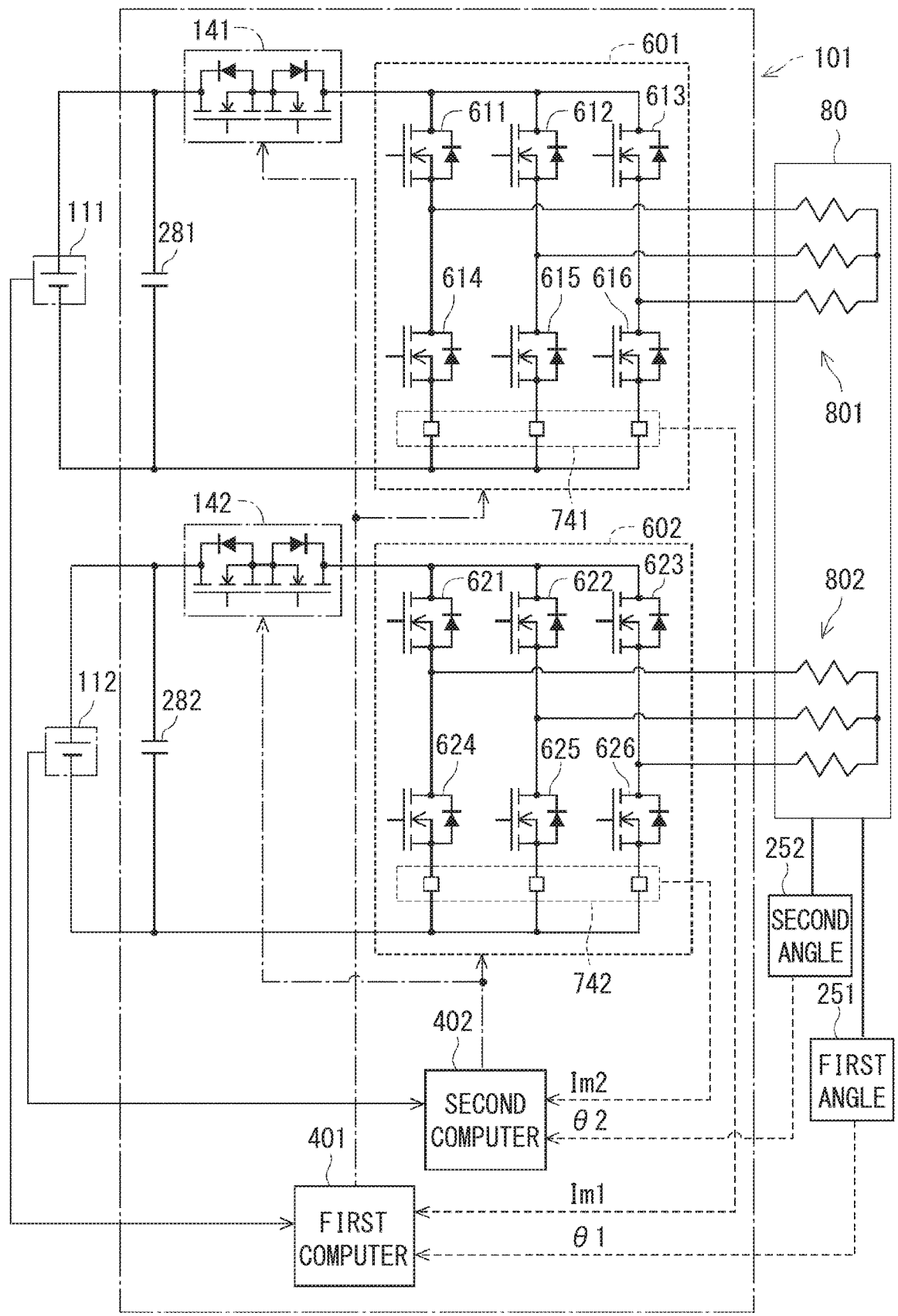
FIG. 6 is an overall configuration diagram of an ECU (motor control device) according to a first embodiment.

As shown in FIG. 5 and FIG. 6, the motor 80 to be controlled by the ECU 10 is the three-phase brushless motor which has two pairs of three-phase winding sets 801 and 802 provided coaxially. The winding sets 801 and 802 have the same electrical characteristics and are wound on the common stator while being shifted from each other by an electrical angle of 30 degrees.

First Embodiment

Next, a detailed configuration of the ECU 10 will be described. The ECU of the first embodiment is designated by a reference numeral 101, and the ECU of the fourth embodiment is designated by a reference numeral 104. Each of the ECUs 101 and 104 is a two-system motor control device including two inverters 601, 602 as power converters and two microcomputers 401, 402, and includes two winding sets 801, 802. Each ECU 101, 104 is configured to control power supply to the motor 80 to control driving of the motor 80. Here, a unit of the components including the winding set, the inverter and the microcomputer form one system.

In the present disclosure, the motor control device is configured for two systems, which are referred to as first and second systems, when necessary. However, when not necessary, each system is referred to simply as a system. Also, except for the switching elements, the reference numerals of the components or signals of the first system are appended with numeral "1", and the components of the second system or signals are appended with numeral "2". Further, for a certain structural component, the system including such a component is referred to as an own system, and another system is referred to as the other system.

Figure 15:
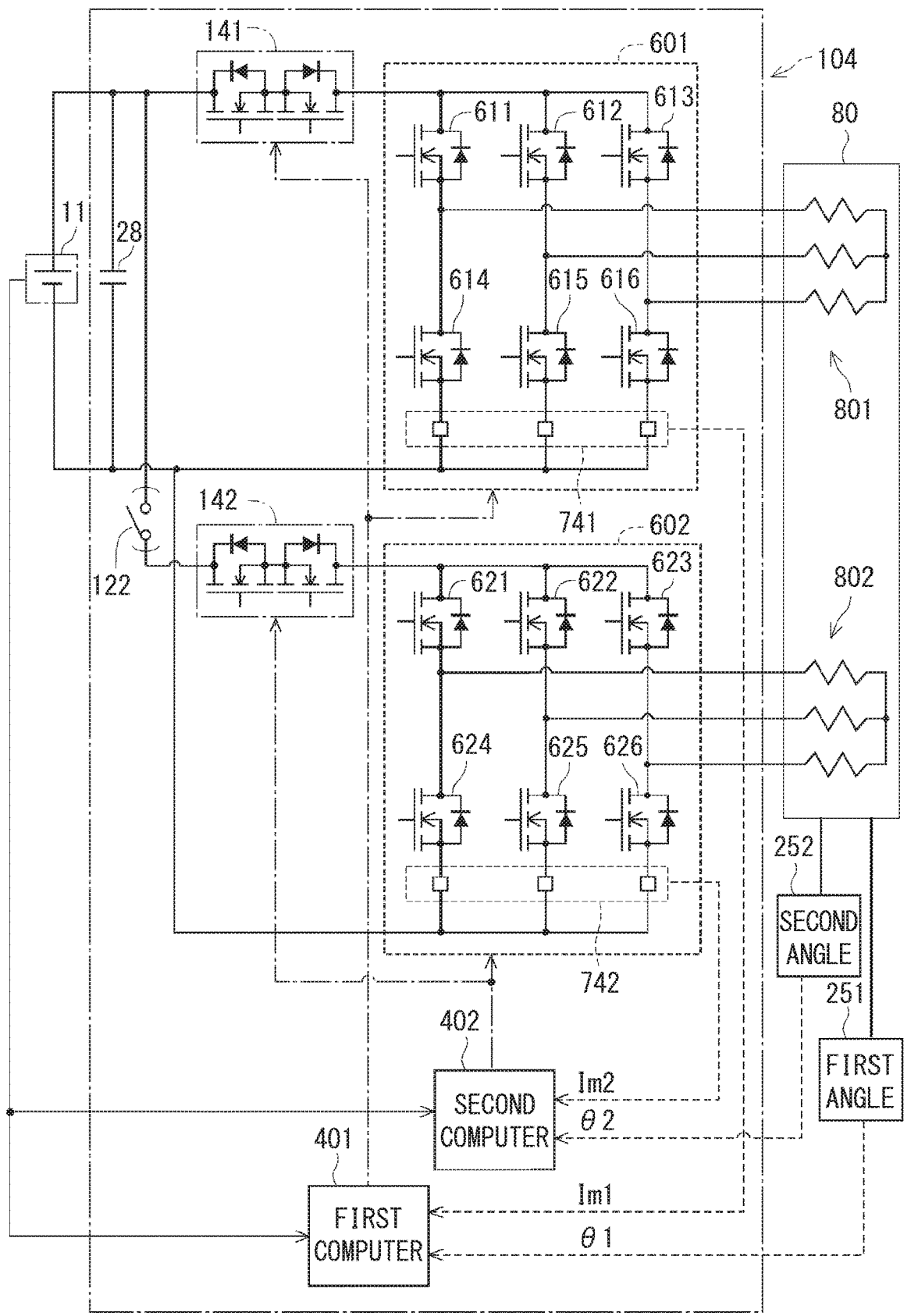
FIG. 15 is an overall configuration diagram of an ECU (motor control device) according to a fourth embodiment.

Between the ECU 101 of the first embodiment and the ECU 104 of the fourth embodiment, the number of power supplies such as batteries connected to the inverters 601, 602 and the microcomputers 401, 402 differs. As shown in FIG. 6, the ECU 101 of the first embodiment is configured to receive power from first and second power supplies 111 and 112 to the first and second systems, respectively. On the other hand, as shown in FIG. 15, the ECU 104 of the fourth embodiment is configured to receive power from one common power supply 11 to both systems. First, the configuration and operation and effect of the ECU 101 of the first embodiment applied to a system having two power supplies 111 and 112 will be described.

FIG. 6 shows an overall configuration of the ECU 101. The ECU 101 includes first and second inverters 601 and 602, first and second power relays 141 and 142, first and second microcomputers 401 and 402, first and second current sensors 741 and 742, and the like for the first and second systems, respectively.

Each of the inverters 601 and 602 has six switching elements 611 to 616 and 621 to 626, such as MOSFETs, for example, which are bridge-connected. In the first system, the first inverter 601 performs a switching operation by a drive signal applied from the first microcomputer 401, converts DC power of the first power supply 111, and supplies the DC power to the first winding set 801. In the second system, the second inverter 602 performs a switching operation according to a drive signal applied from the second microcomputer 402, converts DC power of the second power supply 112, and supplies the DC power to the second winding set 802.

The power supply relays 141 and 142 are provided on the power supply lines of the input sides of the inverters 601 and 602, respectively. The power relays 141 and 142 illustrated in FIG. 6 include a protection function at the time of reverse connection of a power supply, in which two switching elements having parasitic diodes opposite to each other are connected in series. However, the power relay may be configured by one switching element or a mechanical relay that does not include a reverse connection prevention function. In addition, smoothing capacitors 281 and 282 are provided at the input sides of the inverters 601 and 602, respectively.

The first current sensor 741 detects a current Im1 flowing through each phase of the first inverter 601 and the first winding set 801 and outputs a detected current Im1 to the first microcomputer 401. The second current sensor 742 detects a current Im2 flowing through each phase of the second inverter 602 and the second winding set 802, and outputs a detected current Im2 to the second microcomputer 402.

The first rotation angle sensor 251 detects an electrical angle θ1 of the motor 80 and outputs it to the first microcomputer 402. The second rotation angle sensor 252 detects an electrical angle θ2 of the motor 80 and outputs it to the second microcomputer 402. In case the rotation angle sensor is not provided in redundancy, for example, the electrical angle θ2 of the second system may be calculated as θ2=θ1+30 based on the electrical angle θ1 of the first system detected by the first rotation angle sensor 251.

In FIG. 6, the steering torques trq1 and trq2 input to the microcomputers 401 and 402 from the steering torque sensor 93 are not shown for simplicity. The first microcomputer 401 calculates a first drive signal to instruct a power conversion operation of the first inverter 601 based on feedback information such as the steering torque trq1, the current Im1, the rotation angle θ1, and the like. The second microcomputer 402 calculates a second drive signal to instruct a power conversion operation of the second inverter 602 based on feedback information such as the steering torque trq2, the current Im2, and the rotation angle θ2.

Figure 7:
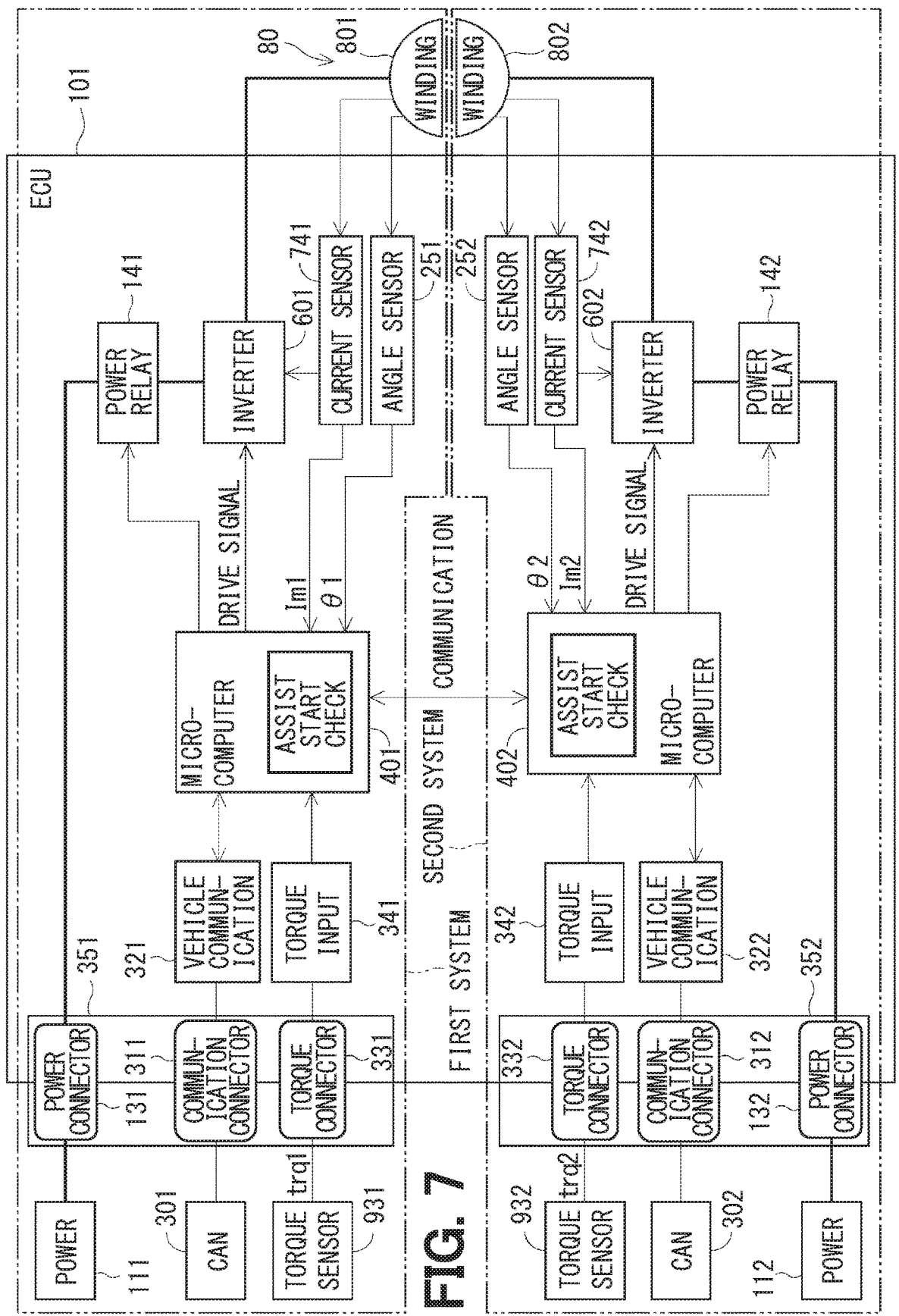
FIG. 7 is a control block diagram of the ECU (motor control device) according to the first embodiment.

FIG. 7 shows a more detailed control configuration of the ECU 101. The first system and the second system are formed of two independent sets of electronic circuit element groups in a fully duplicated system.

A first connector unit 351 of the ECU 101 includes a first power supply connector 131, a first vehicle communication connector 311 and a first torque connector 331. A second connector unit 352 includes a second power supply connector 132, a second vehicle communication connector 312 and a second torque connector 332. Each of the connector units 351 and 352 may be formed as a single connector unit or may be separated into a plurality of connectors.

The first power supply connector 131 is connected to a first power supply 111 which is a DC battery. The power of the first power supply 111 is supplied to the first winding set 801 via the first power supply connector 131, the first power supply relay 141 and the first inverter 601. The power of the first power supply 111 is also supplied to the first microcomputer 401 and sensors of the first system.

The second power supply connector 132 is connected to a second power supply 112 which is also a DC battery. The power of the second power supply 112 is supplied to the second winding set 802 via the second power connector 132, the second power relay 142 and the second inverter 602. The power of the second power supply 112 is also supplied to the second microcomputer 402 and sensors of the second system.

In case CAN (controller area network) is redundantly provided as a vehicle communication network, the first vehicle communication connector 311 is connected between a first CAN 301 and a first vehicle communication circuit 321. The second vehicle communication connector 312 is connected between a second CAN 302 and a second vehicle communication circuit 322. In case the CANs are not provided redundantly, the vehicle communication connectors 311 and 312 may be connected to a common CAN 30. As a vehicle communication network other than CAN, a network of any standard such as CAN-FD (CAN with Flexible Data rate) or FlexRay may be used. The vehicle communication circuits 321 and 322 bidirectionally communicate information with the microcomputer 401 and the microcomputer 402.

The first torque connector 331 is connected between the first torque sensor element 931 and a first torque sensor input circuit 341. The first torque sensor input circuit 341 notifies the first microcomputer 401 of the steering torque trq1 detected by the first torque sensor element 931. The second torque connector 332 is connected between the second torque sensor element 932 and a second torque sensor input circuit 342. The second torque sensor input circuit 342 notifies the second microcomputer 402 of the steering torque trq2 detected by the second torque sensor element 932.

The first and second microcomputers 401 and 402 are configured to execute processes which are software processes. The software process may be implemented by causing a CPU to execute a program. The program may be stored beforehand in a memory device such as a ROM, that is, in a computer-readable, non-transitory, tangible storage medium. Alternatively, a hardware process may be implemented by a special purpose electronic circuit.

The first microcomputer 401 calculates a drive signal for operating the switching operation of the first inverter 601 and applies it as an operation instruction to the first inverter 601. Further, the first microcomputer 401 controls opening and closing of the first power supply relay 141. The second microcomputer 402 calculates a drive signal for operating the switching operation of the second inverter 602 and applies it as an operation instruction to the second inverter 602. Further, the second microcomputer 402 controls opening and closing of the second power supply relay 142.

The microcomputers 401 and 402 are configured to mutually transmit and receive information by inter-computer communication, which is executed between microcomputers. In particular, in the present embodiment, the microcomputers 401 and 402 mutually transmit and receive diagnostic information acquired for an initial check operation through the inter-computer communication. When both systems are determined to be normal, the microcomputers 401 and 402 start driving the motor 80 in synchronization with each other, thereby starting steering assist operation in the electric power steering device 90. That is, the microcomputers 401 and 402 according to the present embodiment particularly have a function as an assist start determination unit. Details of the initial check and the assist start determination will be described later.

Regarding the two-system ECU 101 applied to the system including the two power supplies 111 and 112, an activation process executed from activation of the microcomputers 401 and 402 after the power is turned on until driving of the motor 80 is started will be described below in detail. Preferably, the two power supplies 111 and 112 are ideally turned on simultaneously. However, it is assumed that the ON timings of the first power supply 111 and the second power supply 112 may become different with some time delay due to various factors.

One example of the activation process according to the first embodiment executed when the ON timings of the first power supply 111 and the second power supply 112 are different will be described with reference to time charts of FIG. 8, FIG. 9 and FIG. 10. In this example, it is assumed that the first power supply 111 turns on first, and the second power supply 112 turns on with a delay after the first power supply 111 turns on. After the power is turned on, each of the microcomputers 401 and 402 performs the initial check through the activation sequence to check whether components of each system, particularly components important for performing motor drive control, are normally operable.

Specifically, it is preferred that the diagnosis target of the initial check include the switching elements 611 to 616 and 621 to 626 forming the inverters 601 and 602. It is a minimum basic function in controlling driving of the motor that the switching elements 611 to 616 and 621 to 626 operate as instructed by the microcomputers 401 and 402 and supply desired AC power to each winding set 801 and 802 of the motor 80 by power conversion.

The power supply relays 141 and 142 are provided at input sides of the inverters 601 and 602, and configured to be able to interrupt power supply from the power supplies 111 and 112 to the inverters 601 and 602, respectively. If an abnormality in the power supply system is detected, it is important from the viewpoint of safety that the current is reliably shut off by the power supply relays 141 and 142, respectively. That is, power supply to the motor 80 should be started only when it is guaranteed that the power supply relays 141 and 142 are normal. Therefore, it is preferable that at least one of the first system, which includes the switching elements 611 to 616 and the power relay 141, and the second system, which includes the switching elements 621 to 626 and the power relay 142, be included in the initial check diagnosis target.

Further, it is necessary that the sensor that outputs its detection value used for the initial check is confirmed to be normal before being used in the initial check. For example, in case the initial check is performed based on the detected current or the motor rotation speed, it is preferable to check the current sensors 741 and 742 and the rotation angle sensors 251 and 252 first.

In the first embodiment, in principle, the number of diagnosis targets are the same between the first system and the second system because of duplication, and the initial check process amounts by the microcomputers 401 and 402 are the same. Therefore, as far as the start of calculation is synchronized between the microcomputers 401 and 402, the time required for the initial check ideally does not vary. However, due to the following factors, the time period of the initial check by the microcomputers 401 and 402 may vary.

(1) When waiting for an increase/decrease in voltage due to ON/OFF of a relay or the like, the time becomes different depending on element parameters of electronic circuits. For example, it is likely to occur that, in a case where the voltage check is performed at a cycle of 5 milliseconds (ms), the voltage reaches a threshold value in 4.9 ms after the first system is turned on but the voltage reaches the threshold value in 5.1 ms after the second system is turned on. Thus the check time becomes different.

(2) A difference of several tens to several hundreds milliseconds occurs in charging time of a capacitor or the like due to a difference in power supply voltage.

In the present embodiment, diagnostic information of the initial check by each of the microcomputers 401 and 402, that is, information on whether the diagnosis has been finished or unfinished, and whether the diagnosis result is normal or abnormal is transmitted and received via the inter-computer communication between the microcomputers. In FIG. 8 to FIG. 10, a period during which the inter-computer communication is performed is indicated by a strip-shaped figure with sharp edges in the middle part in each figure. By sharing the timing information by the inter-computer communication, the microcomputers 401 and 402 can synchronize the processes therebetween. Further, by transmitting and receiving abnormality information of each system, it is possible to switch between a two-system drive mode and a one-system drive mode according to the operation state of each system, and to perform appropriate drive. The inter-computer communication between the microcomputers 401 and 402 may use a simple and low-cost "I/O" digital port output other than the inter-computer communication. Further, CAN communication or a dedicated signal line may be used.

Further, the synchronization of the calculations between the microcomputers 401 and 402 is performed in the following manner. It is preferable that the microcomputers 401 and 402 synchronize the calculations of the microcomputers at the time of activation, specifically, the calculations related to the inter-computer communication, the sensing system, the stability and the like. If computer processing is designed on the assumption that synchronization is established between microcomputers, the inter-computer communication may not be established or an unintended operation may occur. In addition, one of the two systems may use data that is one cycle older. If the calculations of the sensing system are not synchronized, a sensor detection value will be used with time delay. Regarding stability, in particular, since the electric power steering device need be operated stably, stabilization control is essential. Asynchrony and delays do not guarantee the intended stability. It is essential to prevent unexpected operation from occurring due to control failure.

Figure 8:
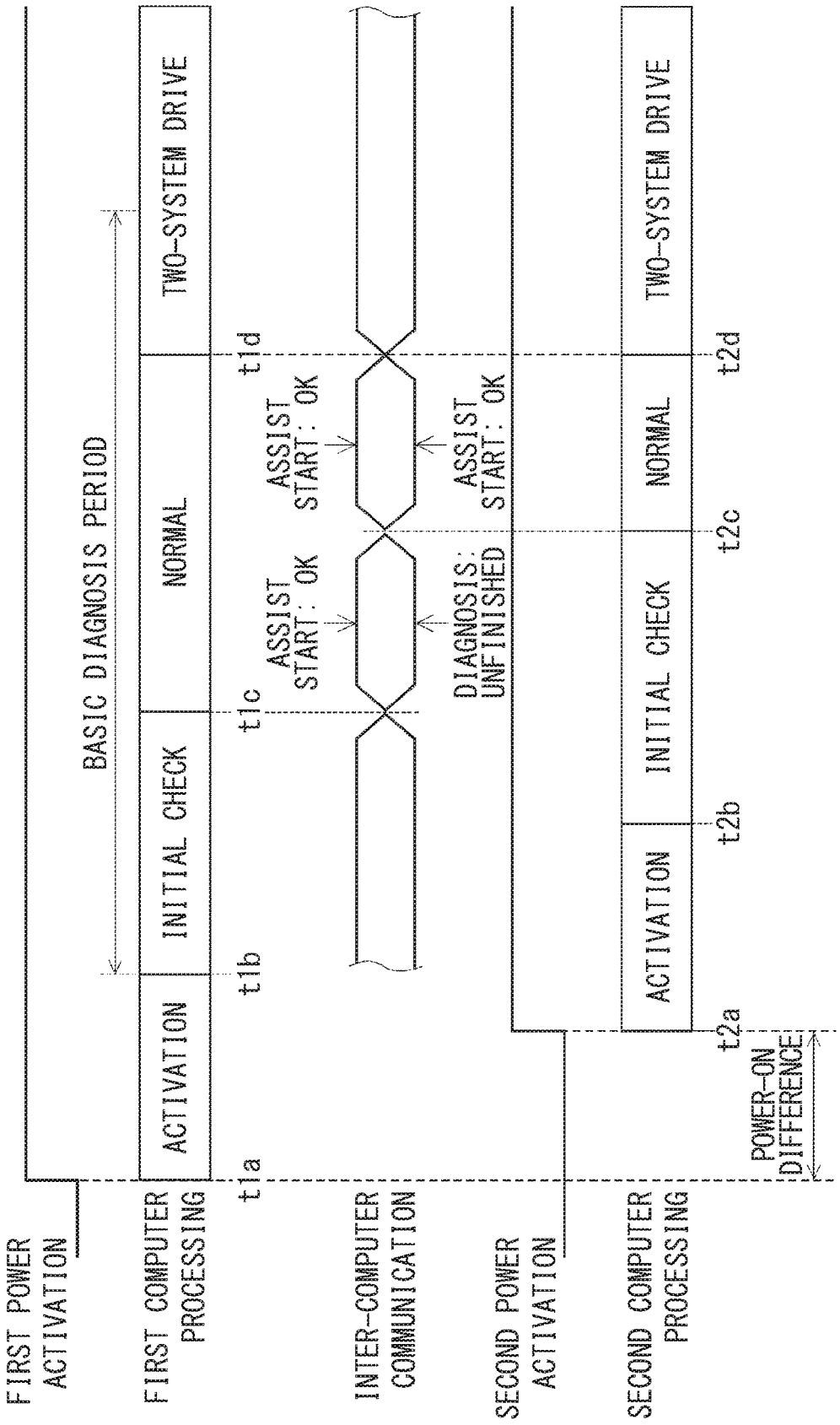
FIG. 8 is a time chart (1) of an activation-time process according to the first embodiment.
Figure 9:
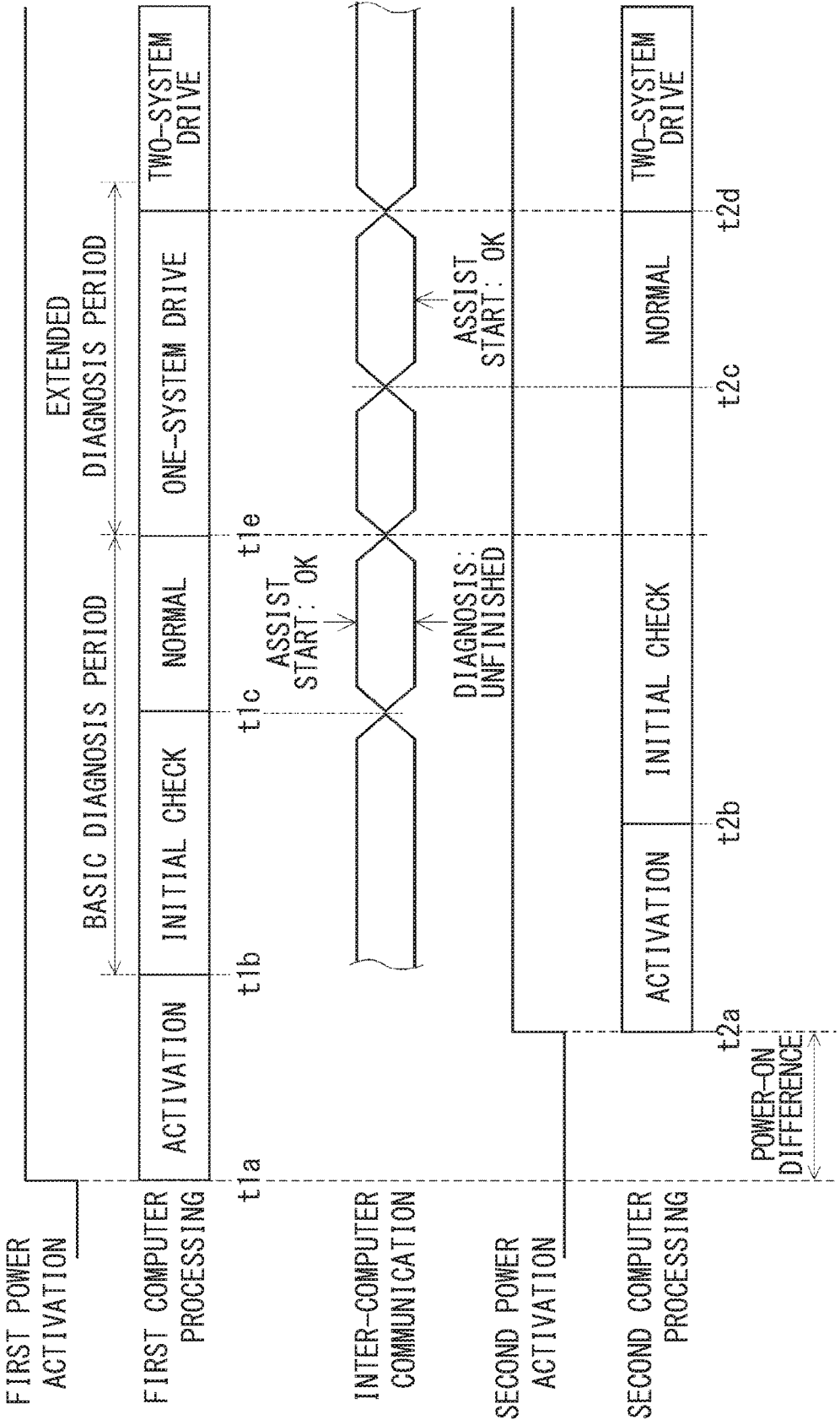
FIG. 9 is a time chart (2) of the activation-time process according to the first embodiment.

Referring to FIG. 8 to FIG. 10 again, the microcomputers 401 and 402 start driving the motor in two or one system according to an initial check result after performing the initial check. Alternatively, although the possibility is actually low, driving of the motor is stopped if both systems are determined to be abnormal. Hereinafter, "assist start" is used in the same meaning as "motor drive start," and "diagnosis" is used in the same meaning as "initial check." Further, in the description of time charts and flowcharts, description of reference numerals such as the first power supply 111, second power supply 112, first microcomputer 401, and second microcomputer 402 is omitted as appropriate.

Figure 10:
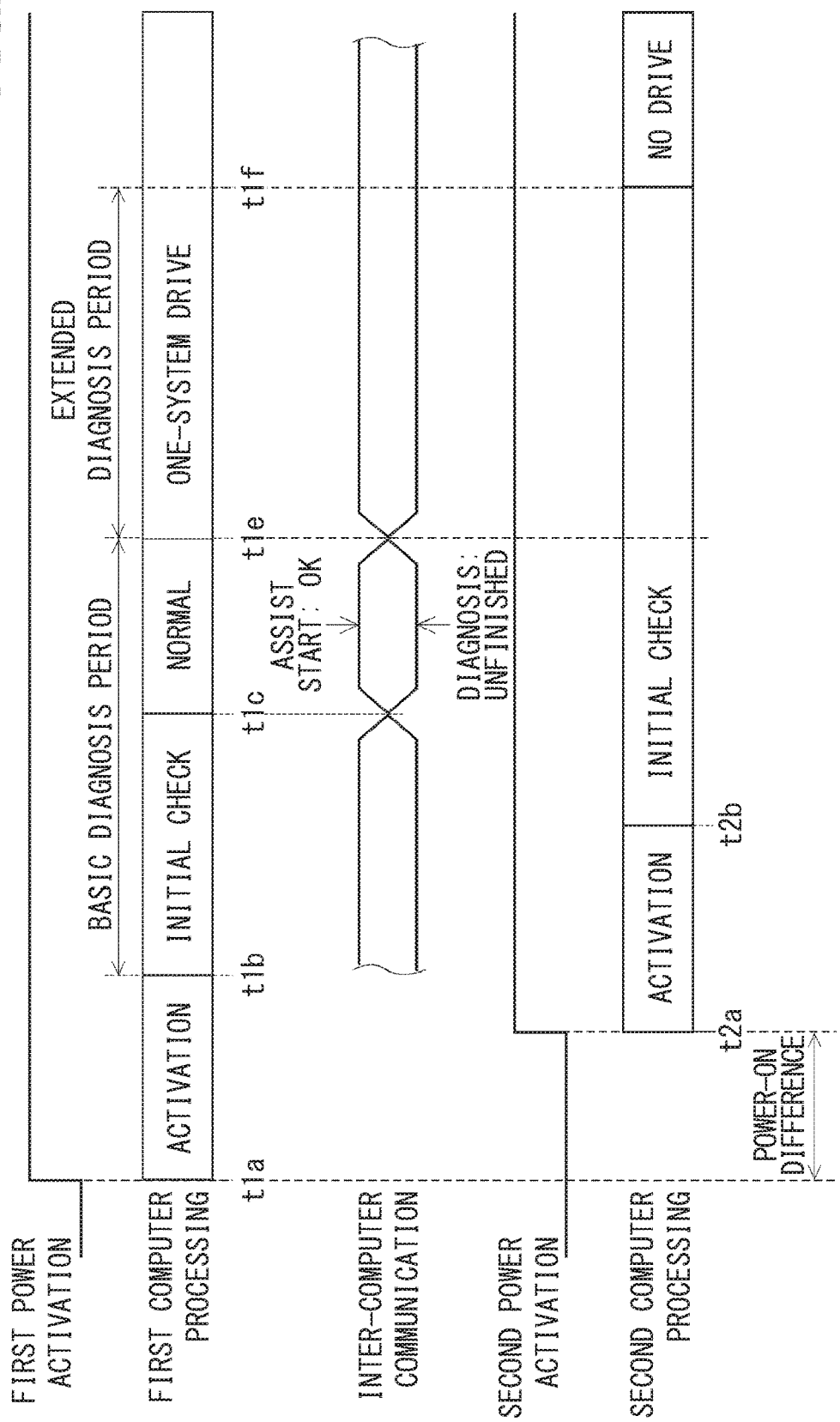
FIG. 10 is a time chart (3) of the activation-time process according to the first embodiment.

In each of the examples shown in FIG. 8 to FIG. 10, the initial check by the first microcomputer is assumed to end before the second microcomputer because of a normality determination, that is, the first system is normal (no abnormality). In each of the examples shown in FIG. 8 and FIG. 9, the initial check by the second microcomputer is assumed to delay from that of the first microcomputer but end with the normality determination finally. In the example of FIG. 10, the initial check by the second microcomputer is assumed to have been unfinished (not completed) finally. Although not shown in the time charts, when the abnormality is determined in the initial check, the system which is determined to be abnormal is determined to be stopped from operating at that time.

In the example shown in FIG. 8, the first power supply is turned on at time t1a, and an activation sequence of the first microcomputer is started. At time t1b, the activation sequence ends, and the first microcomputer starts the initial check of the first system, which is the own system. At time t1c, the first microcomputer finishes the initial check of the first system with the normality determination. After time t1c, the assist start by the first system is in the OK state.

On the other hand, the second power supply is turned on at time t2a which is later than time t1a by a delay period and hence the second microcomputer starts an activation sequence from time t2a. The second microcomputer starts the initial check of the second system at time t2b, which is later than time t1b, and finishes the initial check of the second system at time t2c, which is later than time t1c, with the normality determination. Here, time t2c is a time within the basic diagnosis time described in the example of FIG. 9. After time t2c, the assist start by the second system is also in the OK state.

From time t1c at which the initial check of the first microcomputer is finished to time t2c at which the initial check of the second microcomputer is finished, a signal indicating "assist start OK" is transmitted from the first microcomputer and a signal indicating "diagnosis unfinished" is transmitted from the second microcomputer via the inter-computer communication. The signal "diagnosis unfinished" means that the assist start is NG (not permitted). At this time which is still before an elapse of a predetermined basic diagnosis time period, the first microcomputer does not independently start the assist but waits for the end of the diagnosis of the second microcomputer.

Thereafter, after time t2c, a signal indicating "assist start OK" is transmitted from both of the first microcomputer and the second microcomputer via the inter-computer communication. Thereby, the first microcomputer and the second microcomputer recognize that the own system and the other system are both in the state of assist start OK. Then, the first microcomputer and the second microcomputer start motor driving in two systems in synchronization with the same time t1d and t2d.

Next, in another example shown in FIG. 9, the operations of the first microcomputer at times t1a, t1b and t1c and the operations of the second microcomputer at times t2a and t2b are the same as those in the example of FIG. 8. However, in the example of FIG. 9, time t2c at which the initial check of the second microcomputer ends is after the basic diagnosis time period has elapsed. Here, the basic diagnosis time period is an upper limit time period in which the first microcomputer that has finished the initial check first waits for the completion of the diagnosis of the initial check by the second microcomputer, which is the other system relative to the first system, before the assist of the own system starts.

In the example of FIG. 9, the basic diagnosis time period is calculated from time t1b when the initial check of the first microcomputer is started. Alternatively, time t1c when the initial check of the first microcomputer is finished or time t2b when the following initial check of the second microcomputer is started may be used as the start time of the basic diagnosis time period. That is, the basic diagnosis time period may be set at least within a period of the initial check. For example, when time t1c is the time when the basic diagnosis time period is calculated, the first microcomputer is determined as being normal within the basic diagnosis time period simultaneously with the calculation.

During a period from time t1c to time t1e when the basic diagnosis time period elapses, a signal indicating "assist start OK" is transmitted from the first microcomputer and a signal indicating "diagnosis unfinished" is transmitted from the second microcomputer in the inter-computer communication. When this state continues until time t1e which is the end of the basic diagnosis time period, the initial check of the second microcomputer is determined to be a timeout with respect to the basic diagnosis time period. Therefore, at time t1e, the first microcomputer starts driving the motor with only one of the two systems, that is, the first system, which is determined to be normal. In this example, the first system that has started driving is referred to as a leading system. At this time, the second system that has timed out may be regarded as having a failure, and measures such as failure notification may be taken. However, in the example of FIG. 9, an extended diagnosis time period" is further set from time t1e. The extended diagnosis time period is an upper limit time period after the start of one-system driving of the first system, which is the leading system, until the first microcomputer waits for the completion of the initial check by the second microcomputer.

In FIG. 9, after time t1e, the second microcomputer finishes the initial check at time t2c within the extended diagnosis time period by determining that the second system is normal. In this example, the second system determined to be normal within the extended diagnosis time period is referred to as a following system. After that, from time t2c to time t2d, a signal indicating "assist start OK" is transmitted from the second microcomputer via the inter-computer communication. Then, the first microcomputer and the second microcomputer start driving the motor in two systems in synchronization with time t2d while mutually transmitting and receiving timing information. As a result, a transition is made from the one-system drive mode by the first system as the leading system to the two-system drive mode by the first system as the leading system and the second system as the following system.

In the example of FIG. 10, the second microcomputer does not finish the diagnosis at time t1f when the extended diagnosis time period elapses relative to the example of FIG. 10. Therefore, the initial check of the second microcomputer is determined to be the timeout even in the extended diagnosis time period. That is, at time t1f, it is determined that the second system is prohibited from being driven, and it is determined that only the first system is permitted to continue the one-system drive mode thereafter. In addition, for the second system, for example, a measure such as a failure notification is taken.

Figure 11:
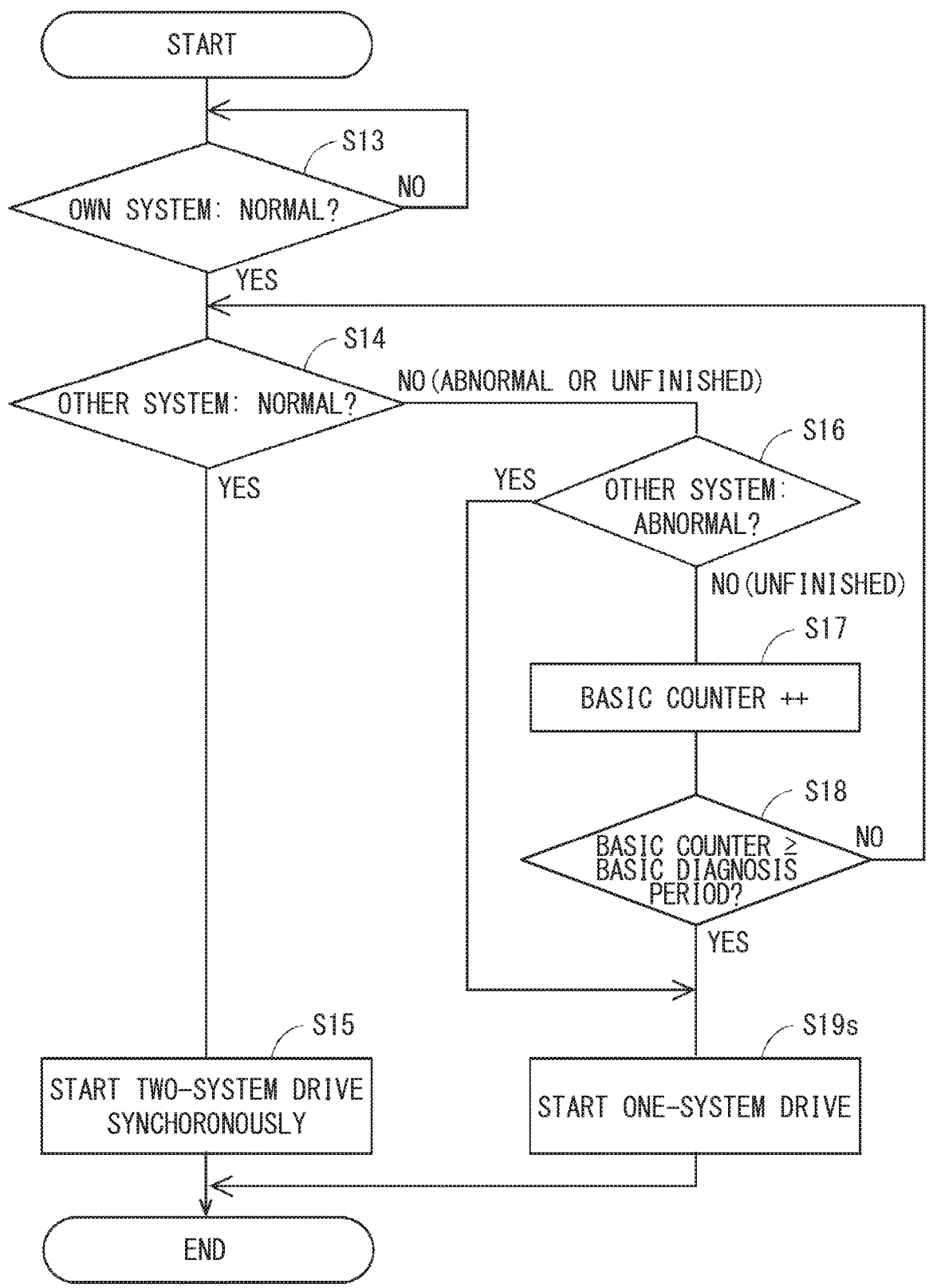
FIG. 11 is a flowchart (1) of the activation-time process according to the first embodiment.
Figure 12:
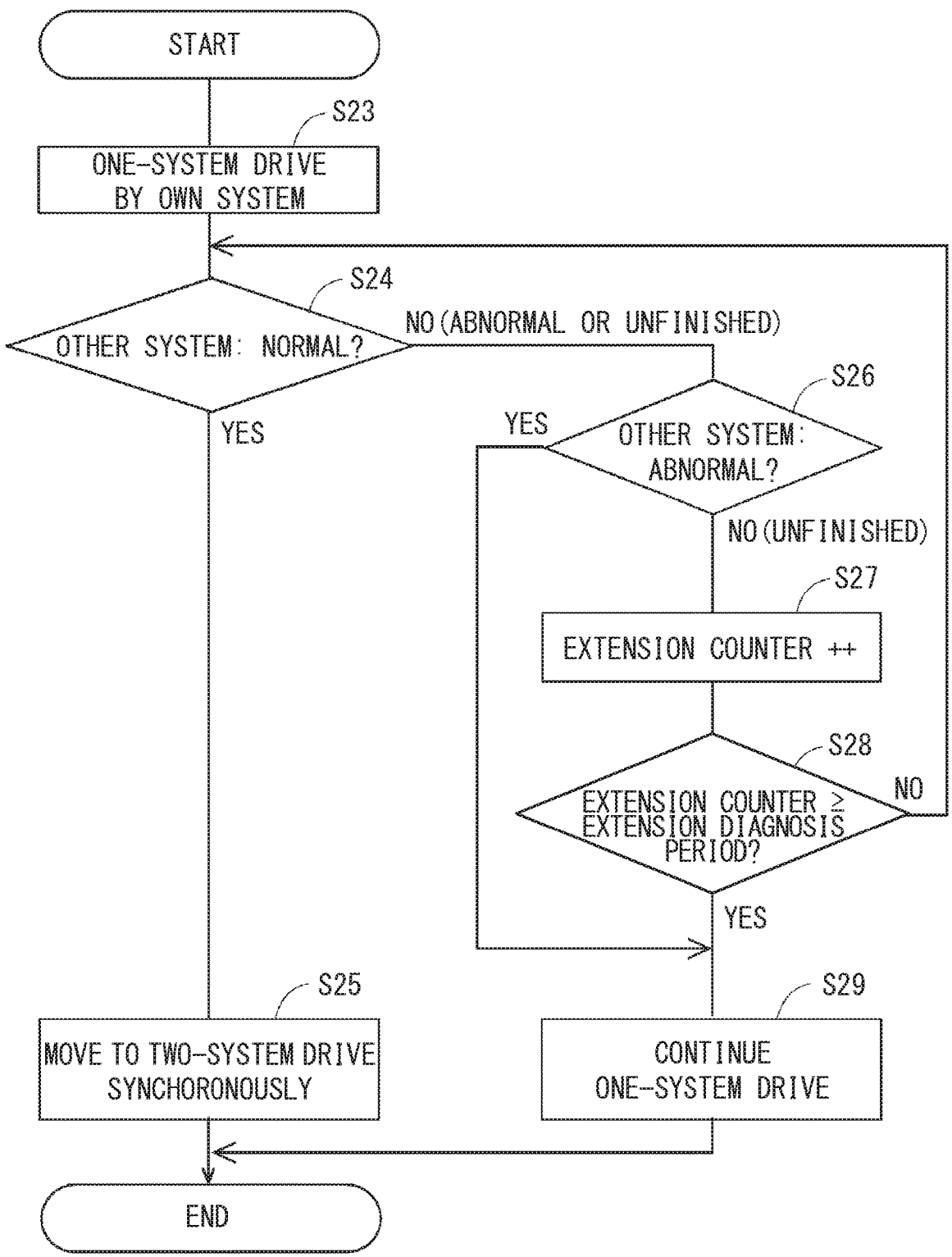
FIG. 12 is a flowchart (2) of the activation-time process according to the first embodiment.

The activation-time process in the first embodiment will be described next with reference to flowcharts shown in FIG. 11 and FIG. 12. FIG. 11 corresponds to the time charts of FIG. 8 and FIG. 9 and show process executed from time within the basic diagnosis time period to time of an elapse of the basic diagnosis time period. FIG. 12 corresponds to the time charts of FIG. 9 and FIG. 10 and shows process executed from time within the extended diagnosis period after the elapse of the basic diagnosis period to time of an elapse of the extended diagnosis time period. In the following description referring to FIG. 8 to FIG. 10, the first system where the first microcomputer performs the initial check is referred to as the own system, and the second system where the second microcomputer performs the initial check is referred to as the other system. In the following description of the flowcharts, symbol S indicates a step. It is noted that, in case the second system where second microcomputer performs the initial check is referred to as the own system, and the first system where the first microcomputer performs the initial check is referred to as the other system.

In FIG. 11, it is assumed that the own system is determined to be normal by the initial check before the other system within the basic diagnosis time period. The first microcomputer checks in S13 whether its own system is determined to be normal, and checks in S14 whether the other system is determined to be normal. If both of the own system and the other system are determined to be normal within the basic diagnosis time periods, the check results are YES in S13 and S14. In this case, the process proceeds to S15 and both of the first microcomputer and the second microcomputer start the two-system drive synchronously.

If the other system is not determined to be normal after the own system is determined to be normal in S13, the check result of S14 is NO. The check result in S14 becomes NO, in case that the other system has already been determined to be abnormal or a case that it is unknown whether it is normal or abnormal because of the unfinished diagnosis. When the check result in S14 is NO, the first microcomputer checks in S16 whether the other system is determined to be abnormal or the diagnosis has not been finished yet. If the other system has been determined to be abnormal, that is, the check result in S16 is YES, the process proceeds to S19s, where the first microcomputer starts the one-system drive by only the own system.

If the diagnosis of the other system has not been finished and the check result in S16 is NO, the process proceeds to S18 after incrementing a basic counter in S17. The basic counter indicates a period of execution of the basic diagnosis in the initial check. In S18, the first microcomputer checks whether the basic counter has reached the basic diagnosis time period. If the basic counter has not reached the basic diagnosis time period and the check result in S18 is NO, the first microcomputer repeats the above-described process from S14. When the basic counter reaches the basic diagnostic time period, the check result in S18 becomes YES indicating the timeout of the basic diagnosis. In this case, in S19s, the first microcomputer starts the one-system drive by its own system only.

When the first system, which is the own system, starts the one-system drive as the leading system, an extension counter starts for the second system, which is the following system. The process shown in FIG. 12 is assumed to follow such a situation. In S23, the first microcomputer confirms that the own system is operating to perform the one-system drive. The first microcomputer then checks is S24 whether the other system is determined to be normal. If the other system is determined to be normal within the extended diagnosis time period, the check result in S24 becomes YES and the process proceeds to S25. In S25, the second microcomputer also starts the drive operation of the second system in synchronization with the first system that has started to operate earlier. In this way, the drive mode shifts from the one-system drive by only the first system to the two-system drive y both of the first system and the second system.

If the other system is not determined to be normal in S24, the check result is NO. The check result in S24 becomes NO, in case that the other system has already been determined to be abnormal or a case that it is unknown whether the other system is normal or abnormal because of the unfinished diagnosis. When the check result in S24 is NO, the first microcomputer checks in S26 whether the other system is determined to be abnormal or the diagnosis has not been finished yet. If the other system is determined to be abnormal, and the check result in S16 is YES, the process proceeds to S29, where the first microcomputer starts the one-system drive by only the own system.

If the diagnosis of the other system has not been finished and the check result in S26 is NO, the process proceeds to S28 after incrementing an extension counter in S27. The extension counter indicates a period of extension of the basic diagnosis period. In S28, the first microcomputer checks whether the extension counter has reached the extended diagnosis time period. If the extension counter has not reached the predetermined extended diagnosis time period and the check result in S28 is NO, the first microcomputer repeats the above-described process from S24. When the extended diagnosis counter reaches the predetermined extended diagnosis time period, the check result in S28 becomes YES indicating the timeout of the extended diagnosis. In this case, in S29, the first microcomputer continues the one-system drive by its own system only. That is, it becomes impossible to shift the motor drive from the one-system drive mode to the two-system drive mode any more.

The effect of the activation process according to the first embodiment will be described. Here, as a comparison example, it is assumed that the steering assist operation starts with a time difference in order from a system which has finished an initial check. In this comparison example, a difference in command values occurs between a microcomputer which has already started a motor drive and a microcomputer which has not yet started a motor drive. In this case, there is a possibility that the two systems are erroneously determined to be abnormal even though both systems are normal. In addition, there is a possibility that control and fail-safe processing, which are basically designed on the assumption that two systems operate simultaneously, may not function properly. Further, a certain measure need be provided for a situation where a plurality of systems do not operate simultaneously.

In contrast, in the first embodiment, when two systems are determined to be normal within the basic diagnosis time period in the initial check, the two systems start the assist operation in a synchronized manner. Therefore, it is possible to prevent an erroneous determination or the like caused by the difference in command values due to the difference in the assist start timings. In addition, it is possible to appropriately perform control and fail-safe processing which are predetermined on an assumption that the two systems operate simultaneously. In particular, in the ECU 101 in which two power supplies 111 and 112 are provided for two systems, respectively, since the shift in the power-on timing is likely to affect the shift in the initial check end timing, the above activation-time process is effective.

In the first embodiment, a two-stage timeout of the basic diagnosis time period and the extended diagnosis time period is set in the initial check. By setting the timeout of the basic diagnosis time period, when the own system is determined to be normal by the initial check first, it is possible to start the assist operation ahead by one system without waiting too long for the other system to be determined normal.

In addition, by setting the extended diagnosis time period, when the following other system is determined to be normal a little later than when the basic diagnosis time period has elapsed, it is possible to shift from the one-system drive mode to the two-system drive mode and improve the assist performance. Further, by setting the timeout of the extended diagnosis time period, it is determined that the system is driven by one system without waiting for the normality determination of the other system endlessly, and the motor drive control can be stabilized.

As a modification of the first embodiment, the timeout of the extended diagnostic time period may not be set. In such a case, unless the other system is determined to be abnormal, the system may shift from the one-system drive mode to the two-system drive mode at any time when the other system is determined to be normal regardless of the time of the initial check.

Second Embodiment

Figure 13:
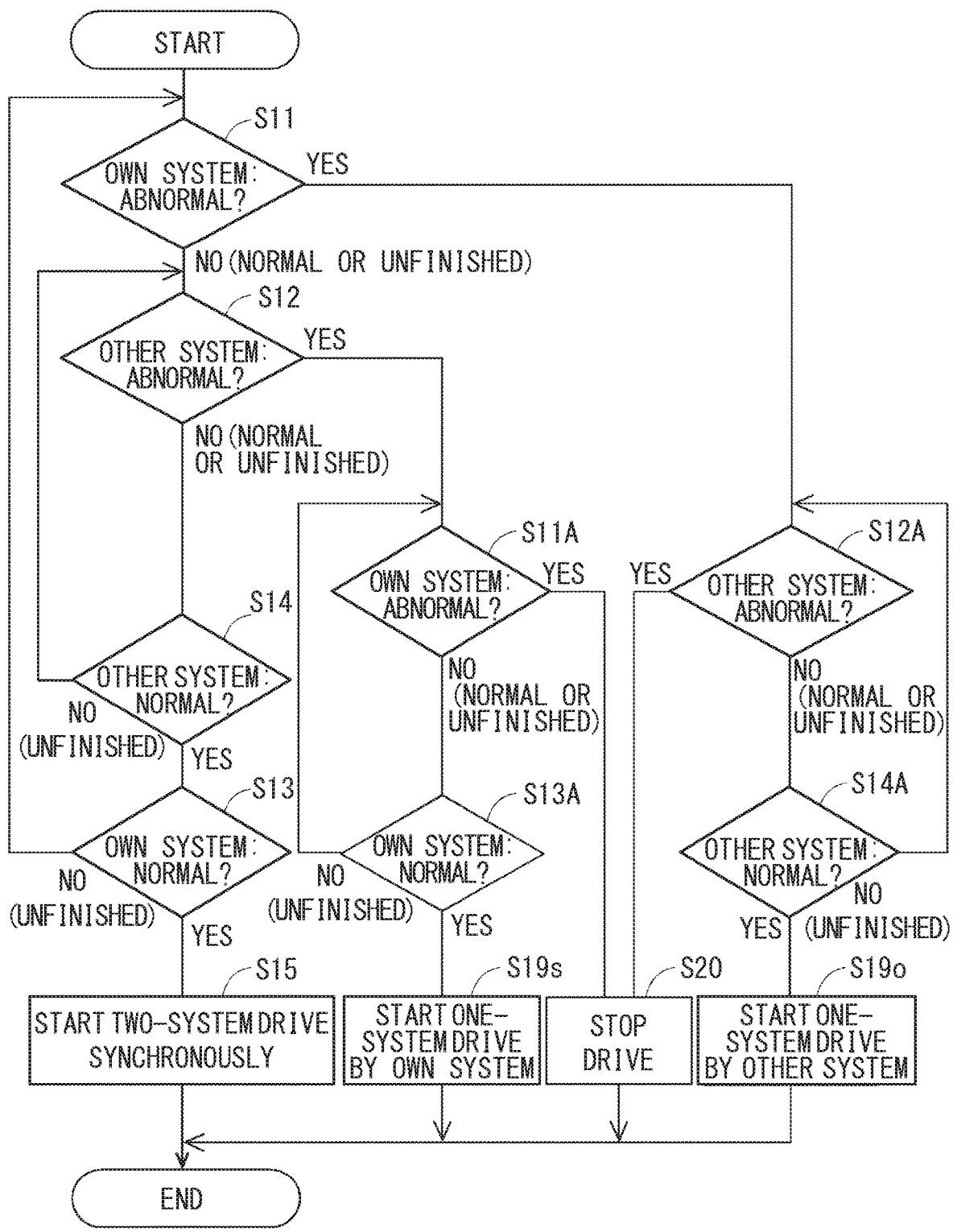
FIG. 13 is a flowchart of an activation-time process according to a second embodiment.

A second embodiment will be described with reference to a flowchart shown n FIG. 13. In the second embodiment, the drive mode is selected after the basic diagnosis time period is not set in the initial check and the drive mode is selected after waiting for a determination of normality or abnormality of the own system and the other system. In the following description, similarly to the example shown in FIG. 11, the first system where the first microcomputer performs the initial check is referred to as the own system, and the second system where the second microcomputer performs the initial check is referred to as the other system. In FIG. 13, substantially the same steps as those in FIG. 11 are denoted by the same step numbers. In case that steps similar to the above steps are repeated, "A" is added to the end of the above step numbers.

In S11 and S12, the first microcomputer checks whether the own system and the other system have been determined to be abnormal. If neither the own system nor the other system has been determined to be abnormal, the check results in S11 and S12 are NO. The check results of NO in S11 or S12 includes a case where the own system or the other system has already been determined to be normal, and a case where it is still unknown whether the system is normal or abnormal due to unfinished diagnosis. The same applies to S11A and S12A described later. In S14, the first microcomputer checks whether the other system has been determined to be normal or the diagnosis has not been finished yet. In S13, the first microcomputer checks whether the other system has been determined to be normal or the diagnosis has not been finished yet. If the other system and the own system have been determined to be normal, and the check results in S14 and S13 are both YES, the process proceeds to S15. In S15, the first and second microcomputers start the two-system drive synchronously.

If it is determined in S14 that the diagnosis of the other system has not been finished yet, the process returns to S12. If it is determined in S13 that the diagnosis of the own system has not been finished, the process returns to S11. In the routine of S11 to S14, S11 and S12 may be executed in reversed order, and S13 and S14 may be executed in reversed order. In the process shown in FIG. 13, when the check result in S13 is NO, S11 is executed again. However, since the check results of NO in S12 and YES in S14, that is, the other system has been determined to be normal, the second and subsequent executions of S12 and S14 may be skipped.

On the other hand, if the own system is determined to be abnormal in S11, the process proceeds to 512A. If the other system is determined to be abnormal in S12, the process proceeds to S11A. If the other system is determined to be abnormal in 512A, or if the own system is determined to be abnormal in S11A, the motor drive is stopped in S20 because both systems are abnormal. If it is determined in 512A that the diagnosis of the other system has not been finished (NO) but determined in 514A that the other system is normal (YES), the one-system drive by the other system is started in S190. If it is determined in S11A that the diagnosis of the own system has not been finished (NO) but determined in 513A that the other system is normal, the one-system drive by the own system is started in S19s.

Also in the second embodiment, when both of the two systems are normal, the first and second microcomputers start the two-system drive in synchronization with each other, as in the first embodiment. Therefore, similarly to the first embodiment, it is possible to attain the similar operations and advantages such as prevention of erroneous determination due to difference between the command values, and enabling control and processing for operating the two systems at the same time.

Third Embodiment

A third embodiment will be described with reference to a time chart shown in FIG. 14. The third embodiment is different from the first embodiment in that a handshake between the microcomputers is performed additionally in the activation sequence of each microcomputer so that the start timings of the initial checks are synchronized. The handshake is a process in which the first microcomputer and the second microcomputer transmit and receive each other a ready signal indicating that they are ready to start an initial check. When the ready signal is normally transmitted and received, it is determined that the handshake is successful, and the first microcomputer and the second microcomputer start the initial check at the same time.

Figure 14:
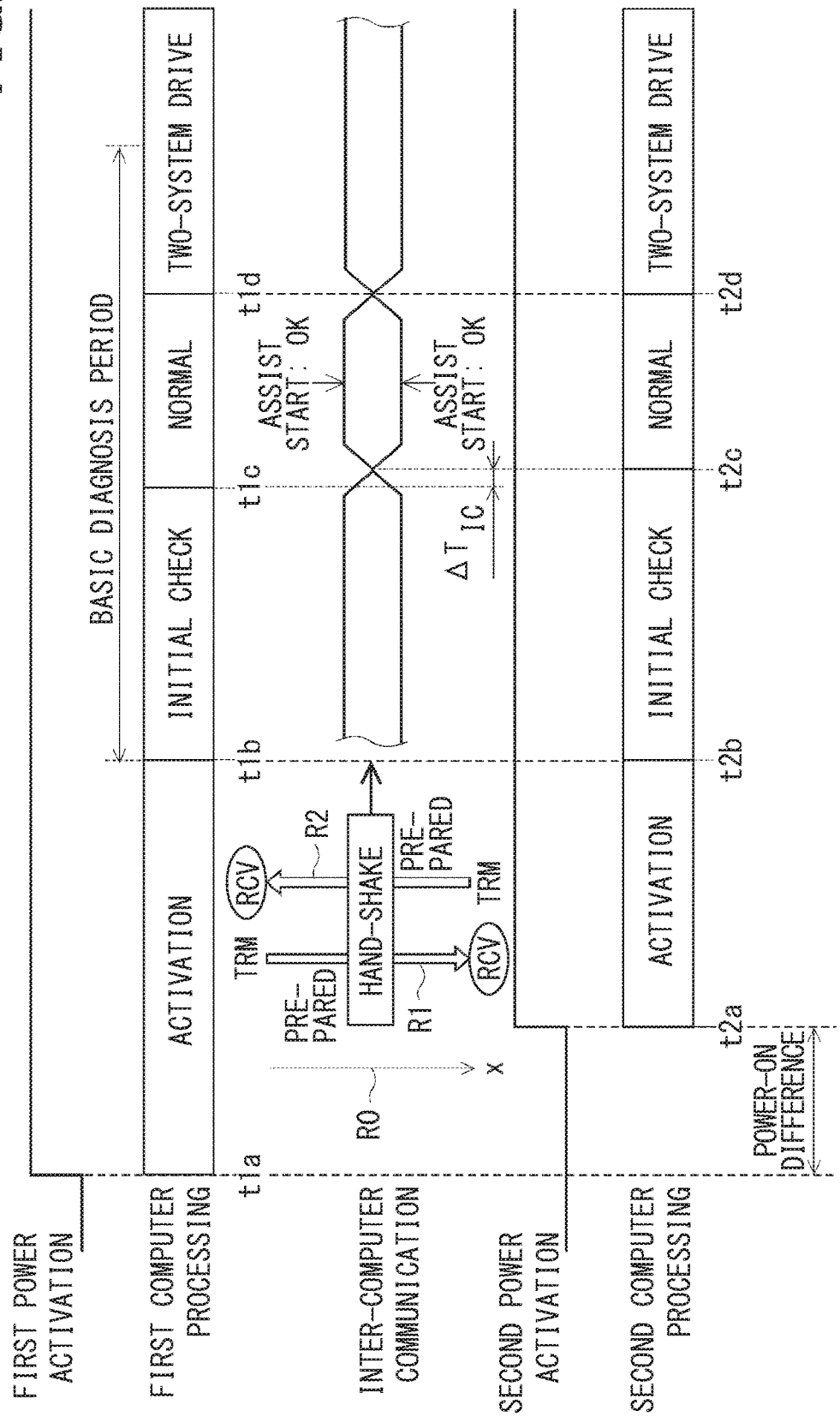
FIG. 14 is a time chart of an activation-time process according to a third embodiment.

In FIG. 14, after time t1a when the first power supply is turned on, the first microcomputer transmits a ready signal R0. At this time, the ready signal R0 is not received because the second microcomputer has not been activated yet. Thereafter, the first microcomputer transmits a ready signal R1 again. At this time, the second microcomputer normally receives the ready signal R1. Then, the second microcomputer transmits a ready signal R2. The handshake is successfully established when the first microcomputer normally receives the ready signal R2. Therefore, the first microcomputer and the second microcomputer start the initial check in synchronization at the same time t1b, t2b.

Here, of the two microcomputers, the role of the microcomputer that transmits the ready signal first and the role of the microcomputer that returns the ready signal of its own microcomputer after receiving the ready signal from the partner microcomputer may be shared in advance. Alternatively, it is possible to configure that the two microcomputers transmit and receive the ready signal equally, that is, any of the microcomputers may transmit the ready signal first.

The ready signal may be communicated using a signal line for the inter-computer communication, or may be communicated via another dedicated line. For example, the ready signal may be generated using a specific waveform of a synchronization signal that synchronizes a timer of each microcomputer. In this case, the ready signal may be communicated using a signal line for the synchronization signal. Alternatively, the ready signal may be notified by changing a signal level of a port signal.

In the third embodiment, the start timings of the initial checks by the microcomputers can be synchronized regardless of the time difference between the power-on timings of the two systems. Therefore, even if the timing of the initial check of each system varies to some extent, it is possible to minimize the time difference $\Delta T_{IC}$ between the end times $t1c$ and $t2c$ of the initial checks. Therefore, it is possible to increase the possibility that the two systems can start the assist drive synchronously within the basic diagnosis time period.

Fourth Embodiment

A fourth embodiment will be described with reference to FIG. 15 which is a modification of the ECU of the first embodiment shown in FIG. 6. In the fourth embodiment, the ECU 104 of the fourth embodiment supplies power to the two systems of the microcomputers 401, 402 and the inverters 601, 602 through a power path branched from a common power supply 11. In the example of FIG. 15, a smoothing capacitor 28 is provided commonly to the two systems at an input side of the branch of the power path, that is, before being divided into the two systems. However, the smoothing capacitor may be provided for each system separately in the branch of the power path, that is, after being divided into the two systems.

In the ECU 104 having this configuration, it is less likely that the difference in power-on timings occurs than in the first embodiment, in which the two power supplies 111 and 112 are provided for each system. However, the start timings of the microcomputers 401 and 402 do not exactly coincide with each other due to factors such as variations in resistances of the power supply paths, the lengths of the communication lines, and the activation timings. In addition, a time difference between the initial checks by the microcomputers may occur similarly. Further, the ECU 104 is assumed to be so configured that a circuit switching relay 122 is used to connect and disconnect the second system to and from the battery 11 switchably. In case that the second microcomputer performs the initial check of the switching relay 12 in this configuration, the numbers of check targets which the first microcomputer and the second microcomputer perform are different. This is likely to cause a difference between the initial check periods. Therefore, in the power supply configuration of the fourth embodiment, the same operation and effect as those of the above embodiments can be achieved.

Other Embodiment (A) The present disclosure is not limited to the two-system configuration exemplified in the above embodiments, but may be similarly implemented in three or more systems. For example, a configuration of three systems of a first system, a second system and a third system including first, second and third microcomputers, respectively, are assumed. In a mode according to the first embodiment, if the first system and the second system are determined to be normal within the basic diagnosis time period but the diagnosis of the third system is not finished within the basic diagnosis time period, the first microcomputer and the second microcomputer start the motor drive operations by the two systems, that is, by the first system and the second system as the leading systems, synchronously. The two-system drive mode in this case corresponds to a partial system drive mode that is not a whole system drive mode. Thereafter, when the third system is determined to be normal within the extended diagnosis time period, the third system starts driving the motor in synchronization with the leading systems.

In a mode according to the second embodiment, when the third system is determined to be abnormal and the first and second systems are determined to be normal, for example, the two systems of the first and second systems that are determined to be normal start the motor drive synchronously. Further, when the second system and the third system are determined to be abnormal and only the first system is determined to be normal, for example, the motor drive is performed by only one system, that is, the first system. With such an operation, the same operation and effect as those of the two-system configuration can be achieved.

(D) The motor 80 to be controlled in the above-described embodiments is a multiple winding motor in which two pairs of winding sets 801 and 802 are arranged on a common stator while being shifted from each other by the electrical angle of 30 degrees. As another embodiment, two or more sets of winding sets may be arranged in the same phase in the motor to be controlled. Further, the motor configuration is not limited to a configuration of two or more sets of windings arranged on the common stator. For example, a plurality of motors, each of which has respective winding sets wound on respective stators, may jointly output a torque. In addition, the number of phases of the multi-phase brushless motor is not limited to three phases but may be four or more phases. Further, the motor to be driven is not limited to the AC brushless motor but may be a DC motor with brushes. In that case, an H-bridge circuit may be used as the power converter.

(C) The motor control device of the present disclosure is not limited to the steering assist motor of the electric power steering apparatus, but may be applied to a motor for any other use.

(D) The initial check of the present disclosure may be, for example, program integrity verification (secure boot) as known conventionally.

The present disclosure should not be limited to the embodiment described above. Various other embodiments may be implemented without departing from the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor control device for controlling driving of a motor having a plurality of winding sets, the motor control device comprising:
   a plurality of power converters provided in correspondence to the plurality of winding sets to convert power input from one or more power supplies and supply converted power to the plurality of winding sets, respectively; and
   a plurality of microcomputers provided in correspondence to the plurality of power converters to calculate drive signals which are instructed to the plurality of power converters, respectively, wherein:
   the plurality of winding sets, the plurality of power converters and the plurality of microcomputers are connected to form a plurality of systems, respectively;
   the plurality of microcomputers is configured to execute initial checks of structural components of the plurality of systems after being activated, respectively;
   the plurality of microcomputers is configured to prohibit a motor drive by the plurality of systems, when the plurality of systems are determined to be abnormal by the initial checks, respectively;
   the plurality of microcomputers is configured to start the motor drive synchronously by at least two systems of the plurality of systems, when the at least two systems are determined to be normal by the initial checks; and
   the plurality of microcomputers is configured to start the motor drive solely by only one of the plurality of systems, when the only one of the plurality of systems is determined to be normal by the initial check.

2. The motor control device according to claim 1, wherein:
   the plurality of microcomputers is configured to start the motor drive by only a first part of the plurality of systems as a leading system part, when only the first part of the plurality of systems is determined to be normal within a predetermined basic diagnosis time period in a time period of the initial check and the initial check of other part of the plurality of the systems is unfinished at an elapse of the predetermined basic diagnosis time period in the time period of the initial check.

3. The motor control device according to claim 2, wherein:
   the plurality of microcomputers is configured to start, as a following system part, the motor drive in synchronization with the leading system part, when a second part of the plurality of systems, the initial check of which have not been finished at the elapse of the predetermined basic diagnosis period, is determined to be normal within a predetermined extended diagnosis time period after starting of the motor drive by the leading system.

4. The motor control device according to claim 1, wherein:
   the plurality of microcomputers is configured to transmit and receive diagnosis information of the initial checks one another via inter-computer communication.

5. The motor control device according to claim 1, wherein:
   the plurality of microcomputers is configured to synchronize respective calculations at time of activation.

6. The motor control device according to claim 1, wherein:
   the plurality of microcomputers is configured to transmit and receive ready signals, which indicate readiness for starting the initial checks, one another, and start the initial checks in synchronization with one another when the ready signals are transmitted and received normally.

7. The motor control device according to claim 1, wherein:
   the plurality of power converters is connected to receive power from a plurality of power supplies, respectively.

8. The motor control device according to claim 1, wherein:
   the structural components of the plurality of systems include at least one of switching elements forming the plurality of power converters and a plurality of power relays provided at input sides of the plurality of power converters to turn on and off power supplies from the plurality of power supplies to the plurality of power converters, respectively.

9. The motor control device according to claim 1, wherein:
   the plurality of microcomputers are mounted on a same surface of a same circuit board and separated from one another by a predetermined space.

10. A motor drive system comprising:
    the motor control device according to claim 1; and
    a brushless motor having the plurality of winding sets provided coaxially and supplied with power by the motor control device.

11. The motor drive system according to claim 10, wherein:
    the motor control device is mounted integrally on one axial side of the motor.

12. A motor drive system for an electric power steering apparatus of a vehicle, the motor drive system comprising:
    the motor control device according to claim 1; and
    a motor driven by the motor control device for outputting a steering assist torque,
    wherein at least two of the plurality of systems start an assist operation synchronously by the at least two of the plurality of systems, when the at least two of the plurality of systems are determined to be normal in the initial checks.

13. The motor drive system according to claim 12 further comprising:
    first and second power supplies, wherein
    first and second power converters of the plurality of power converters convert power supplied from the first and second power supplies and supply converted power to the first and second winding sets of the motor, respectively;
    first and second microcomputers of the plurality of microcomputers are configured to calculate the drive signals to be applied to the first and second power converters, respectively;
    first and second current sensors for detecting currents supplied to the first and second power converters or the first and second winding sets; and
    first and second rotation angle sensors for detecting electrical angles of the motor and outputting detected electric angles to the first and second microcomputers, respectively.

14. A motor control method of a motor control device, which includes a plurality of power converters provided in correspondence to a plurality of winding sets and converting power input from at least one power supply and supplying converted power to the plurality of winding sets, respectively, and a plurality of microcomputers provided in correspondence to the plurality of power converters and calculating drive signals as instructions to the plurality of power converters, respectively, wherein the plurality of winding sets, the plurality of power converters and the plurality of microcomputers form a plurality of systems, respectively, the motor control method comprising steps of:
- performing initial checks of structural components of the plurality of systems by the plurality of microcomputers after being activated, respectively;
- prohibiting a motor drive to be performed by one of the plurality of systems, which is determined to be abnormal by the initial check;
- starting the motor drive by at least two of the plurality of systems synchronously, when the at least two of the plurality of systems are determined to be normal by the initial checks; and
- stating the motor drive solely by only one of the plurality of systems, which is determined to be normal by the initial check.

* * * * *